United States Patent
Gu

(10) Patent No.: US 12,363,072 B2
(45) Date of Patent: Jul. 15, 2025

(54) STATELESS CLOUD AUTHENTICATION FOR SECURITY SERVICES

(71) Applicant: Palo Alto Networks, Inc., Santa Clara, CA (US)

(72) Inventor: Jinsheng Gu, Dublin, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 322 days.

(21) Appl. No.: 18/091,010

(22) Filed: Dec. 29, 2022

(65) Prior Publication Data
US 2024/0223534 A1 Jul. 4, 2024

(51) Int. Cl.
H04L 9/40 (2022.01)
(52) U.S. Cl.
CPC ...... H04L 63/0245 (2013.01); H04L 63/0236 (2013.01); H04L 63/0435 (2013.01)
(58) Field of Classification Search
CPC ............ H04L 63/0245; H04L 63/0236; H04L 63/0435
See application file for complete search history.

(56) References Cited

U.S. PATENT DOCUMENTS

2013/0269020 A1* 10/2013 Griffin ............... H04L 63/083
726/9
2023/0236898 A1* 7/2023 McElhoe ............ H04L 63/102
718/1

OTHER PUBLICATIONS

Aldya et al., Stateless Authentication with JSON Web Tokens using RSA-512 Algorithm, Jurnal Infotel Informatics—Telecommunication—Electronics Website Jurnal : http://ejournal.st3telkom.ac.id/index.php/infotel, ISSN : 2085-3688; e-ISSN 2460-0997, Jurnal Infotel vol. 11, No. 2, May 2019, pp. 36-42.
Boyd et al., From Stateless to Stateful: Generic Authentication and Authenticated Encryption Constructions with Application to TLS, Sep. 19, 2016.
Byoungcheon Lee, Stateless Re-Association in WPA3 Using Paired Token, Electronics 2021, 10, 215. https://doi.org/10.3390/electronics 10020215, pp. 1-13.
Dacosta et al., One-Time Cookies: Preventing Session Hijacking Attacks with Stateless Authentication Tokens, Converging Infrastructure Security (CISEC) Laboratory Georgia Institute of Technology, 2011, pp. 1-31.
Ethelbert et al., A JSON Token-Based Authentication and Access Management Schema for Cloud SaaS Applications, 2017.

* cited by examiner

*Primary Examiner* — Hee K Song
(74) *Attorney, Agent, or Firm* — Van Pelt, Yi & James LLP

(57) ABSTRACT

Techniques for providing stateless cloud authentication are disclosed. In some embodiments, a system/method/computer program product for providing stateless cloud authentication includes receiving a request at a first firewall of a cloud-based security service to access a protected resource; generating an authentication token with opaque information using a cloud authentication service; and verifying the authentication token using the opaque information.

14 Claims, 8 Drawing Sheets

FIG. 2

```
2021-02-10 22:13:47.814 -0800 debug: _make_known_id_buf (pan_authd_cas_opaque.c:83) : data = 10.57.100.51
2021-02-10 22:13:47.814 -0800 debug: _make_known_id_buf (pan_authd_cas_opaque.c:84) : data len = 12
2021-02-10 22:13:47.814 -0800 debug: _generate_opaque (pan_authd_cas_opaque.c:224) : digest len = 20
2021-02-10 22:13:47.818 -0800 debug: pan_cryptod_sysd_encr (pan_cryptod_sysd_api.c:110) : For plain text(len=20) : [xxx] ...
2021-02-10 22:13:47.818 -0800 debug: pan_cryptod_dump_buf (pan_cryptod_sysd_api.c:749) : [xxx] ...
2021-02-10 22:13:47.818 -0800 debug: pan_cryptod_sysd_encr (pan_cryptod_sysd_api.c:158) : Retrieved encrypted key(len=77) :
2021-02-10 22:13:47.818 -0800 debug: pan_cryptod_dump_buf (pan_cryptod_sysd_api.c:749) : [xxx] ...
2021-02-10 22:13:47.818 -0800 debug: _generate_opaque (pan_authd_cas_opaque.c:234) : enc len = 77
2021-02-10 22:13:47.818 -0800 debug: _generate_opaque (pan_authd_cas_opaque.c:257) : b64 len = 114
2021-02-10 22:13:47.818 -0800 debug: create_token(pan_authd_cas_internal.c:261) : Generated the opaque: G8skYAAAAAtQVE9PWFoREZMZmVHajZQaXVxMG1XR
nBVMHI1SjRsWT13VXI0SmhtQnMzUy9uZzNkUG9menMrQ2tnQkh1a0lmYm1SaUs0ekRnb2c0PQ
```

PAYLOAD: DATA

```
{
"iat" : 1613024027,
"exp" : 1613024147,
"SID" : "6fc8bf97-6679-4b9e-8084-379bebb39109",
"TID" : "55660694609148838528",
"PID" : "b624e41c-0dc4-4f53-a45b-dceff65bacaf",
"SN" : "007099000010690"
"PanOSversion" : "10.1.0-c159.dev_s_rel",
"UserType" : "admin",
"CB" : "https://10.5.104.125:443/SAML20/SP/ACS",
"post" : true,
"ForceMFA" : false,
"RelayState" :
"uAAAANfMlWB2c31zPSZhdXRoPSZpZD02OWYyMT1mMDk5NzBhMjkND
kxZWY4OGUzMGJmMjVjYw==",
"APTO" : 0,
"Opaque" :
"G8skYAAAAAtQVE9PWFoREZMZmVHajZQaXVxMG1XRnBVMHI1SjRsWT
13VX10SmhtQnMzUy9uZzNkUG9menMrQ2tnQkh1a01mYm1SaUs0ekRnb
2c0PQ"
}
```

```
2021-02-10 22:14:09.073 -0800 debug: _make_known_id_buf (pan_authd_cas_opaque.c:83) : data = 10.57.100.51
2021-02-10 22:14:09.073 -0800 debug: _make_known_id_buf (pan_authd_cas_opaque.c:84) : data len = 12
2021-02-10 22:14:09.076 -0800 debug: pan_cryptod_sysd_decr (pan_cryptod_sysd_api.c:473) : For encrypted key(len=77) :
2021-02-10 22:14:09.076 -0800 debug: pan_cryptod_dump_buf (pan_cryptod_sysd_api.c:749) : [xxx] ...
2021-02-10 22:14:09.076 -0800 debug: pan_cryptod_sysd_decr (pan_cryptod_sysd_api.c:520) : Retrieved plain text(len=20) :
2021-02-10 22:14:09.076 -0800 debug: pan_cryptod_dump_buf (pan_cryptod_sysd_api.c:749) : [xxx] ...
2021-02-10 22:14:09.076 -0800 debug: _validate_opaque (pan_authd_cas_opaque.c:324) : Decrypted opaque is verified......
2021-02-10 22:14:09.076 -0800 debug: sanity_check_aud (pan_authd_cas_internal.c:720) : Validated the opaque: G8skYAAAAAAtQVE9PWFoREZMZmVHajZQaXVxM
G1XRnBVMHI1SjRsWT13VXI0SmhtQnMzUy9uZZNkUG9menMrQ2tnQkhIa0lmYm1SaUs0ekRnb2c0PQ
```

PAYLOAD: DATA

```
{
  "InResponseTo": "6fc8bf97-6679-4b9e-8084-
379beb39109",
  "aud": "245, 55660694609148838528, b624e41c-0dc4-4f53-
a45b-
dceff65bacaf, G8skYAAAAAAtQVE9PWFoREZMZmVHajZQaXVxMG1XRn
BVMHI1SjRsWT13VX10SmhtQnMzUy9uZZNkUG9menMrQ2tnQkhIa01mY
m1SaUs0ekRnb2c0PQ",
  "UserName": "2kuser",
  "Result": true,
  "AuthContext": {
  "Groups": [
```

FIG. 3

STATELESS CLOUD AUTHENTICATION FOR SECURITY SERVICES

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 2 illustrates example code for creating an opaque payload data for providing stateless cloud authentication for security services in accordance with some embodiments.

FIG. 3 illustrates example code for verifying the opaque payload data for providing stateless cloud authentication for security services in accordance with some embodiments.

DETAILED DESCRIPTION

Figure 1A:
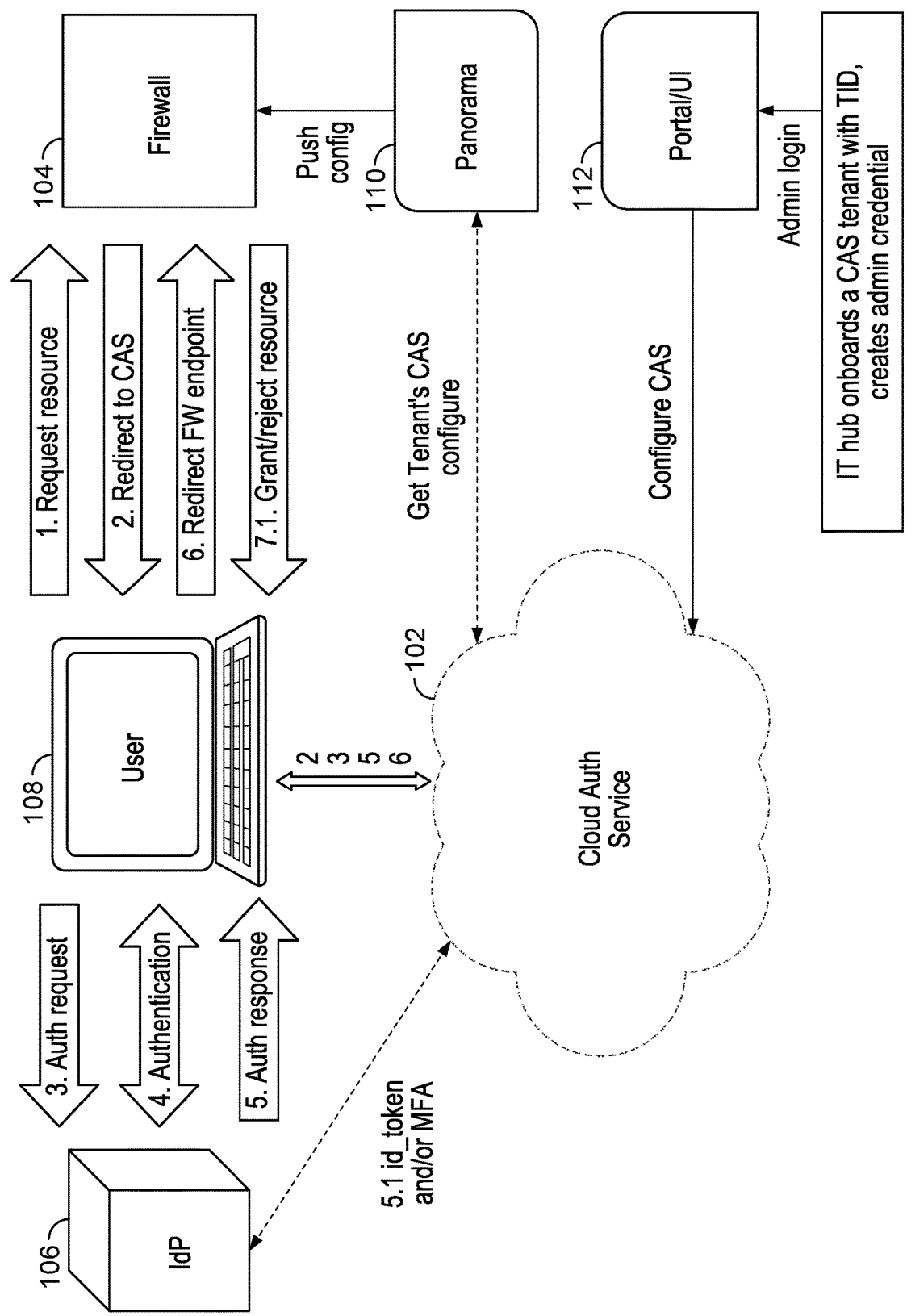
FIG. 1A illustrates a system architecture for providing stateless cloud authentication for security services in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, antimalware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises to identify and control applications, users, and content not just ports, IP addresses, and packets-using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Security Challenges for Stateless Cloud Authentication

Technical security challenges exist for stateless cloud authentication.

Generally, stateless authentication is needed for cloud authentication services. For example, for a cloud-based security service (e.g., or another cloud-based service), stateless authentication for a compute entity (e.g., a firewall for the cloud-based security service) that initiates an authentication request may not be the same compute entity (e.g., the same firewall for the cloud-based security service) that receives the cloud authentication response, which can occur if the firewalls are behind, for example, a network load balancer. As another example, if a Cloud Authentication Service (CAS) token is stolen from a user's browser/client machine, then an attacker can reuse the token for potentially nefarious purposes (e.g., a replay/DDoS attack, etc.).

Specifically, firewall administrators are facing the following technical security challenges with Security Assertion Markup Language (SAML) authentication for cloud-based security service firewalls (e.g., Prisma Access (PA) firewalls for the PA cloud-based security service that is commercially available from Palo Alto Networks, Inc., headquartered in Santa Clara, CA). For example, it can be challenging and time consuming to set up and configure SAML authentication for spinning up additional/new gateways, such as for a customer with gateways that are in different regions (e.g., Americas, Asia, Europe, etc.) and have different SAML ACS URLs that typically need to be manually registered at their identity provider (IDP) (e.g., example IDP vendors include Azure, Google, and Okta). Also, network/security administrators (admins) generally need to manually create different registrations at their IDP, such as one for each GlobalProtect (GP) Portal/Client VPN Portal, GP Gateways, and Authentication Portal. In addition, troubleshooting is challenging when the SAML authentication (auth) fails (e.g., as it may only indicate that the SAML auth failed, and to get to the root cause of the problem, admins would need to go through a large and verbose SAML payload). Even for a single firewall, admins generally need to manually create different registrations at their IDP, one for each of their portals (e.g., GP, CP/Auth Portal, and Admin user interface (UI)).

As such, stateless authentication presents technical security challenges for authentication for security services and/or other cloud-based services utilizing stateless authentication.

Techniques for Stateless Cloud Authentication

As will be further described below with respect to various embodiments, a stateless solution for a Cloud Authentication Service (CAS) (e.g., stateless authentication for cloud-based security services, such as for the pangp.gpcloudservice.com available from Palo Alto Networks, Inc., headquartered in Santa Clara, CA) is disclosed. However, in this example, a Cloud Authentication Service (CAS) token (e.g., also referred to herein as a Cloud Identity (ID) Engine (CIE) token), which is used to grant access to a security service (e.g., for the pangp.gpcloudservice.com available from Palo Alto Networks, Inc.), could be generated (e.g., spoofed) by an attacker at will, if the CAS token sign certificate (cert) (e.g., CIE token sign cert) is compromised/stolen by the attacker. For example, the stolen CAS token sign cert can be used by the attacker to replay/gain access by spoofing a valid token to gain access to the cloud-based security service.

As such, new and improved techniques for stateless cloud authentication are needed.

Accordingly, new and improved techniques for stateless cloud authentication, such as for cloud-based security services and/or other cloud-based services are disclosed.

In some embodiments, stateless authentication for security services includes receiving a request at a first firewall of a cloud-based security service (e.g., in which the first firewall and a second firewall of the cloud-based security service share a master key, which as used herein can generally refer to a symmetric key or an asymmetric key that can include a public key and private key pair or a certificate; in an example implementation, the master key can include an asymmetric key pair, i.e., <key1, key2> pair, or a certificate, which can be pushed from a security management system, such as Panorama, in which the <key1, key2> pair, or <public key, private key> in the certificate, is not published externally, and in which key1 can be used to encrypt data, and key2 to decrypt data) to access a protected resource; generating an authentication token with opaque information (e.g., encrypted/hashed critical information, such as a time stamp, a host ID, and a remote IP address) using a cloud authentication service; and verifying the authentication token using the opaque information.

In some embodiments, stateless authentication for security services further includes providing secure access to the resource via a second firewall of the cloud-based security service (e.g., in which the first firewall and a second firewall of the cloud-based security service can share a master key).

Accordingly, various techniques for providing stateless cloud authentication are disclosed as will now be further described below.

System Architectures for Providing Stateless Cloud Authentication for Security Services FIG. 1A illustrates a system architecture for providing stateless cloud authentication for security services in accordance with some embodiments. Referring to FIG. 1A, Portal/User Interface (UI) 112 can be used by a tenant admin to provision their Cloud Authentication Service (CAS) 102 (e.g., also referred to herein as a Cloud Identity (ID) Engine). After the tenant admin user login into the Portal/UI (e.g., IT hub can onboard a CAS tenant with Tenant ID (TID) and creates an admin credential as also shown in FIG. 1A), a configuration for a tenant's identity provider (IdP) 106 (e.g., example IDP vendors include Azure, Google, and Okta) can be imported and/or entered into the UI, which then can read from and write into the cloud data store (e.g., cloud database) of CAS 102 as further described below.

As shown in FIG. 1A, CAS 102 accepts the redirected authentication requests from a firewall 104 (e.g., a Palo Alto Networks' firewall or another commercially available firewall) and routes the users to the configured Identity Provider to perform stateless cloud authentication. In an example implementation, CAS 102 includes a network load balancer, a transaction cache, and a cloud data store and of courses instances of the CAS. As such, user 108 is redirected to the CAS to perform stateless cloud authentication, and then the CAS will redirect the user back to firewall 104/Panorama 110 (e.g., a security/firewall management platform that is commercially available from Palo Alto Networks, Inc., headquartered in Santa Clara, CA, and/or another commercially available security/firewall management platform can be similarly used) with an authentication token.

Referring to the example workflow illustrated in FIG. 1A, a tenant onboards using an IT hub, when subscribing/buying a CAS license. This results in a new customer account ID and its corresponding admin login access to the Portal/UI. The tenant admin logs into the Portal/UI and provisions the CAS with its IdP settings as the CAS auth profile. Panorama (e.g., or a firewall if it is not managed by Panorama) admin user configures the auth profile, if a Cloud Authentication Service type is selected, and drop down UI menus are presented. If a region drop down is clicked, a backend completer is invoked to obtain a list of the CAS region information (e.g., if not cached or cache expired). After a region is selected, a backend completer is invoked on the CAS to retrieve CAS metadata, including a CAS token signing cert (if not cached or cache expired for this region) and another backend completer is invoked on the CAS to obtain the array of (e.g., tenant ID, list of this tenant CAS auth profiles, etc.), and the list is populated for the admin to select. Cloud authentication is activated after the tenant onboarding, tenant CAS provisioning, and Panorama/firewall configuration. The user is redirected by the firewall to the CAS with a token signed by a private key, where the token has certain claims: CAS auth profile id, callback, and RelayState (e.g., the RelayState parameter can be implemented as a string parameter that the IdP passes back without any modification or inspection to the Service Provider (SP), and the SP can use the RelayState parameter to keep track of what resource the user originally requested and/or the assigned session ID, etc., and it is used widely in SAML or other Single Sign On protocols). The CAS redirects the user to the IdP based on their setting of the CAS auth profile. The CAS receives a callback from the IdP, creates a token based on the result, and signs it with a CAS private key. CAS redirects the user back to the firewall with the RelayState and token. Finally, the firewall verifies the signature in the token with the CAS token signing cert, extracts the username from the claims, performs an allow list check and/or other checks/verifications can also be performed at this stage of the workflow.

As discussed above, the disclosed techniques for providing stateless cloud authentication for security services and/or other services can mitigate the security risks associated with security handling of the token (e.g., CAS auth token). For example, security risks can arise if the CAS private key is compromised and/or if the CAS token is compromised/stolen (e.g., from the network between the CAS and the firewall/Panorama) such that the attacker can use the compromised/stolen token to perform a replay attack to gain access to the firewall/Panorama. In order to detect such an attack, the firewall/Panorama can perform the following critical information checks/verifications of the CAS auth token: (1) CSP ID in the claim "aud"; (2) Tenant ID in the claim "aud"; (3) Profile ID in the claim "aud"; and (4) Opaque in the claim "aud". Specifically, the disclosed techniques for providing stateless cloud authentication for security services and/or other services can further mitigate the security risks associated with security handling of the token by generating opaque data that is included in the CAS auth token as will now be described below.

FIG. 2 illustrates example code for creating an opaque payload data for providing stateless cloud authentication for security services in accordance with some embodiments. As shown in FIG. 2, the CAS auth token can be enhanced for security verification purposes by embedding opaque data in the payload of the CAS auth token to facilitate stateless cloud authentication for security services as will now be further described below.

In one embodiment, the CAS auth token includes opaque data. In an example implementation, the opaque data is base64 encoded content with the following components: (1) a time stamp of when it is generated; and (2) a master key encrypted hash of critical information where a hash (e.g., adler32 resulting in opaque data size of 87 bytes, MD5 resulting in opaque data size of 114 bytes, SHA1 resulting in opaque data size of 114 bytes, SHA256 resulting in opaque data size of 140 bytes, or another hash algorithm can be similarly used). Specifically, the critical information can include, for example, the following information: a host ID of the client machine (e.g., user end), remote host ID of the client machine (e.g., IP address of user end), a fully qualified domain name (FQDN) of the firewalls behind the load balancer (e.g., firewall end), and/or other information can similarly be included in the set of critical information. The opaque data can similarly be added to the firewall token, which can be validated using the CAS token. For example, the opaque data can be calculated at the firewall and then embedded in the firewall token. After the successful authentication of the user against the IdP, the CAS can create a CAS token by inserting the opaque data in it without any modification. When the firewall, not necessarily the original firewall that redirected the user to the CAS, receives the CAS token, it is not just verifying the signature in the token, but it is also validating the opaque data, to safeguard stateless cloud authentication.

FIG. 3 illustrates example code for verifying the opaque payload data for providing stateless cloud authentication for security services in accordance with some embodiments. In this example implementation, the opaque data embedded in the CAS auth token (CAS token) can be used to prevent such attacks as will now be described. The CAS token can be verified using the opaque data embedded in the CAS token by checking the following: (1) the time stamp exceeds a timeout threshold (e.g., 600 seconds old) by comparing the time stamp; (2) the hash does not match due to a different master key; and/or (3) the hash does not match due to the critical information missing in the embedded opaque data payload of the CAS token. If any of these example verifications of the CAS token fails, then the CAS token is rejected.

Further, using the above-described opaque data embedded in the CAS token and verification techniques, the device that receives the CAS token may not be the device that initiated the auth request to the CAS (e.g., the firewalls can be located behind a load balancer, such as in a Prisma Access deployment in which a plurality of firewalls share the same master key and FQDN of the load balancer, such as similarly described above), but it can apply the same above-described verification mechanism to calculate the embedded opaque data and compare it against that in the CAS token. As such, the disclosed techniques facilitate a cloud authentication solution that is both stateless and secure.

Figure 1B:
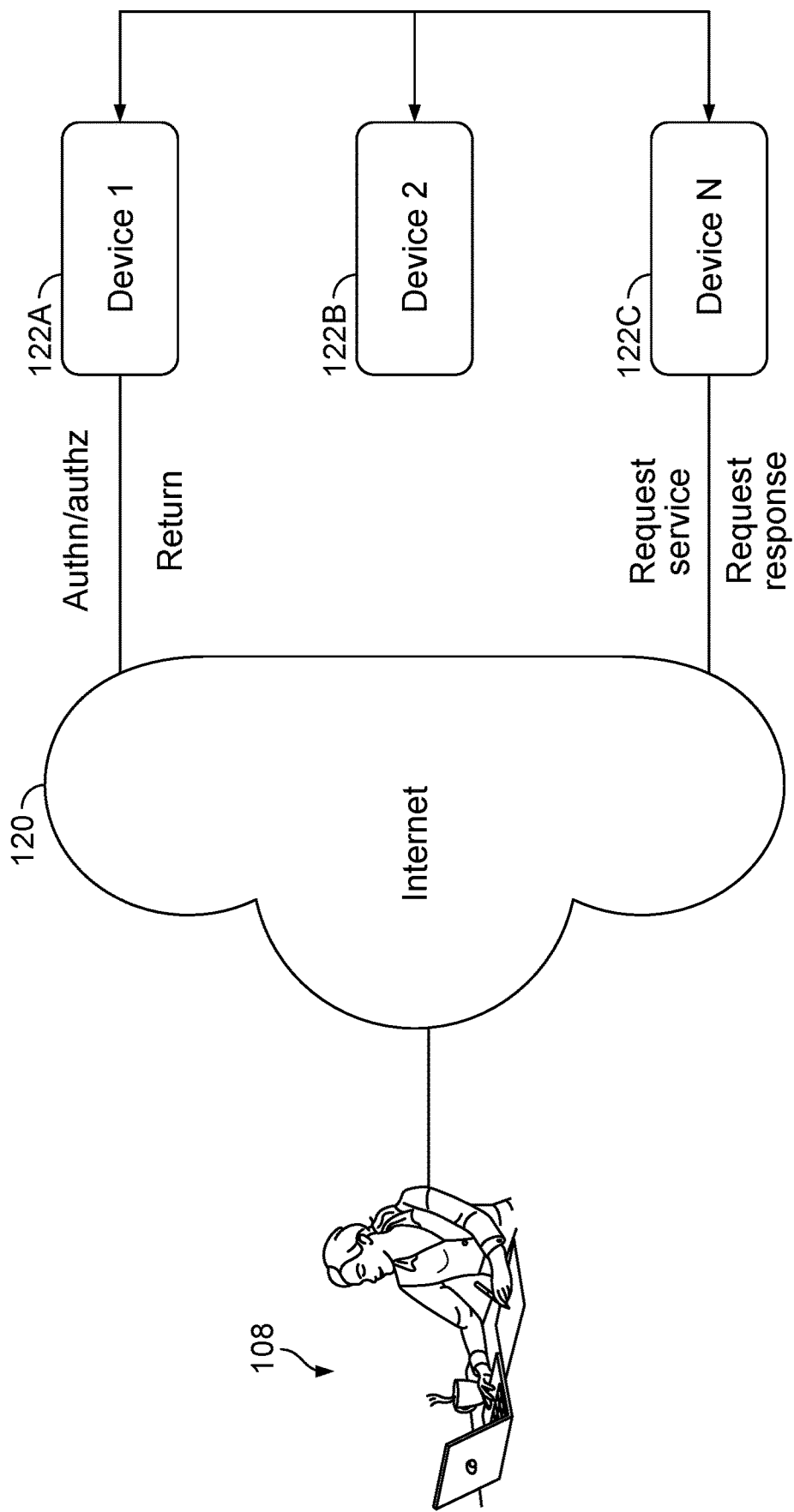
FIG. 1B illustrates another system environment for providing stateless cloud authentication in accordance with some embodiments.

FIG. 1B illustrates another system environment for providing stateless cloud authentication in accordance with some embodiments. Referring to FIG. 1B, in this example system environment, a cluster of devices 122A, 122B, and 122C provide services (e.g., cloud-based services) to the client or user as shown at 108 via the Internet 120. In this example system environment, the clustered devices 122A-C are behind a load balancer (e.g., not shown in FIG. 1B) for the service (e.g., creating an SSL VPN, API, and any one of them can provide the service for the trusted client). Specifically, the devices are in a high availability (HA) deployment and share common information that is specific to the cluster, including the following common information: (1) FQDN as they are behind a load balancer; (2) symmetric key (e.g., master key); (3) asymmetric key (e.g., certificate); and (4) realm/domain.

The client in this example environment is the endpoint/user that requests services from clustered devices. The client has certain properties that are unique to the client. For example, the client's unique properties can include the following: (1) the username associated with the client; (2) the client host name; (3) the client IP (e.g., remote host); (4) the client machine ID (e.g., MAC address); and (5) the browser associated with the client (e.g., browser type and version of the browser).

As such, the above-described techniques for stateless cloud authentication as described above with respect to FIG. 1A can be similarly implemented for the authentication of client 108 with devices 122A-C by embedding opaque information associated with the client 108 and the devices 122A-C in the auth tokens as similarly described above with respect to FIGS. 1A, 2, and 3.

Figure 1C:
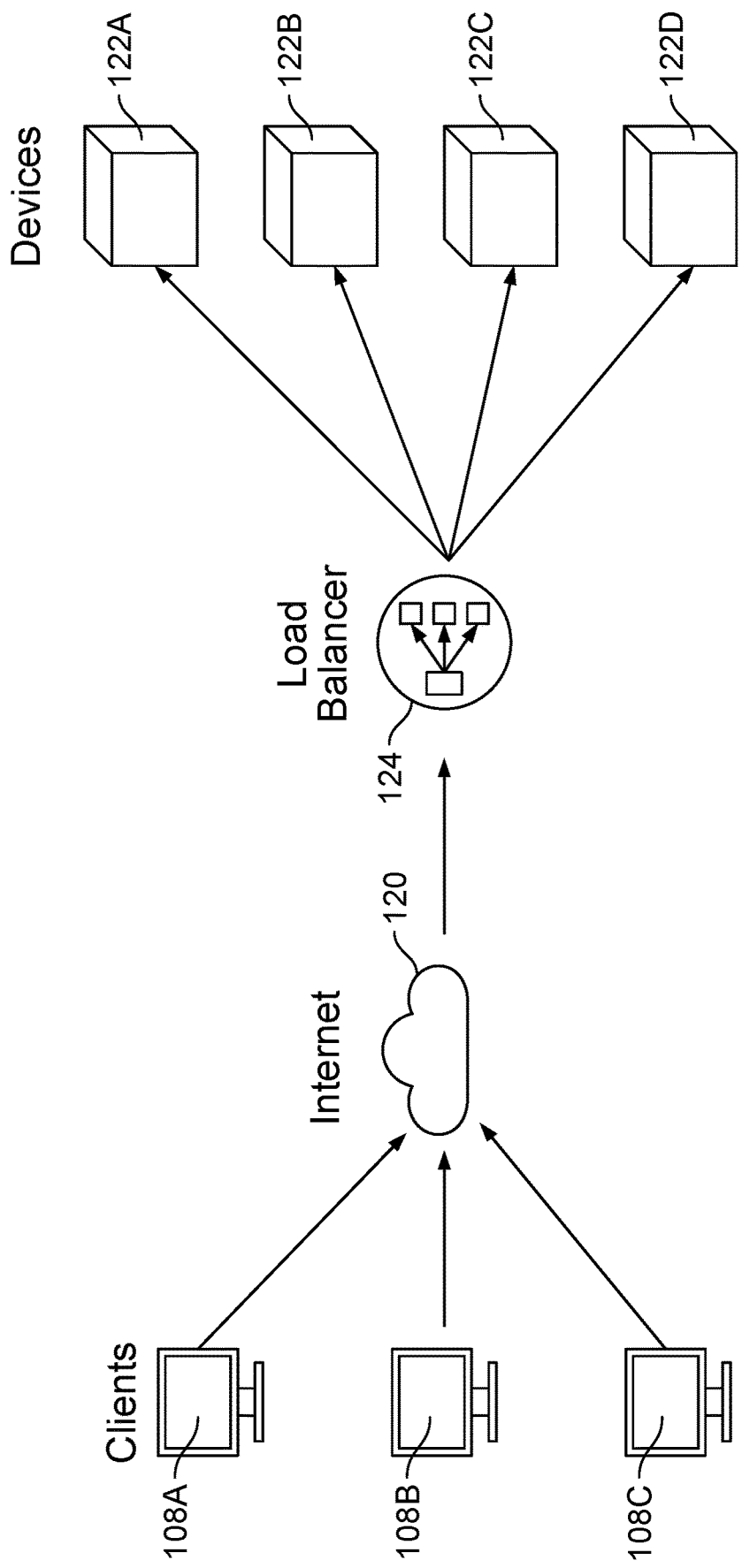
FIG. 1C illustrates yet another system environment for providing stateless cloud authentication for security services in accordance with some embodiments.

FIG. 1C illustrates yet another system environment for providing stateless cloud authentication for security services in accordance with some embodiments. Referring to FIG. 1C, in this example system environment, a cluster of devices 122A, 122B, 122C, and 122D provide services (e.g., cloud-based services) to the clients as shown at 108A, 108B, and 108C via the Internet 120. In this example system environment, the clustered devices 122A-D are behind a load balancer 124 for the service (e.g., creating an SSL VPN, API, and any one of them can provide the service for the trusted client). Specifically, the devices are in a high availability (HA) deployment and share common information that is specific to the cluster, including the following common information: (1) FQDN as they are behind a load balancer; (2) symmetric key (e.g., master key); (3) asymmetric key (e.g., certificate); and (4) realm/domain.

As similarly described above, to facilitate stateless cloud authentication in this example system environment, any device in the cluster needs to provide the service to the trusted client securely. Specifically, the authentication is stateless, which means that the authentication request can be redirected to a remote identity provider from a device 122A-D and redirected back to any device 122A-D in the same cluster (e.g., as similarly described above with respect to FIG. 1A). Also, the service can be provided by any device 122A-D in the cluster. Accordingly, as similarly described above, the disclosed techniques for stateless cloud authentication can prevent cyber-attacks and provide service from any of the devices in the cluster to the trusted client by using a fingerprint of the unique information about the client and cluster during/after authentication/authorization that can be embedded in a token (e.g., CAS auth token) using the above-described opaque data that can be verified as also similarly described above.

Each of the clients in this example environment can similarly request services from clustered devices. Each of the clients have certain properties that are unique to each respective client. For example, the client's unique properties can include the following: (1) the username associated with the client; (2) the client host name; (3) the client IP (e.g., remote host); (4) the client machine ID (e.g., MAC address); and (5) the browser associated with the client (e.g., browser type and version of the browser).

As such, the above-described techniques for stateless cloud authentication as described above with respect to FIG. 1A can also be similarly implemented for the authentication of client 108 with devices 122A-D by embedding opaque information associated with the client 108 and the devices 122A-D in the auth tokens as similarly described above with respect to FIGS. 1A, 1, 2, and 3.

Figure 4:
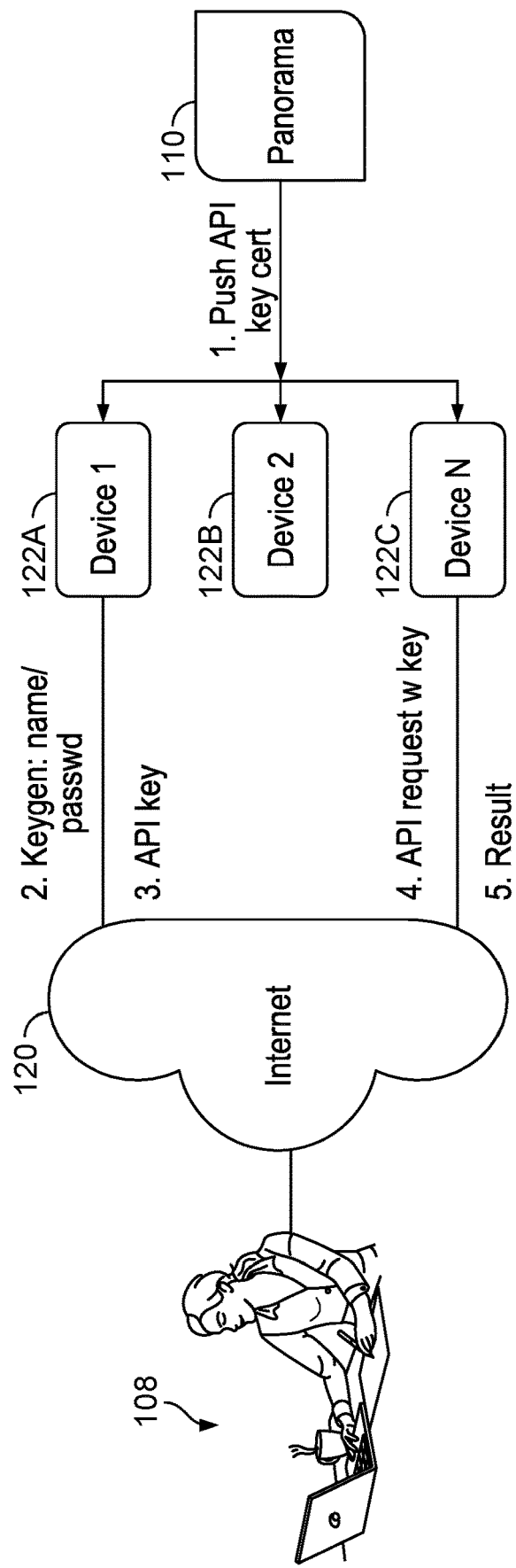
FIG. 4 illustrates another system architecture using an API for providing stateless cloud authentication in accordance with some embodiments.

FIG. 4 illustrates another system architecture using an API for providing stateless cloud authentication in accordance with some embodiments. An existing API Key encrypts the username and password with a device master key. This gives a false sense of security to the customer that increases the potential risk of having the key mistreated and leak the user credential, resulting in greater security risks to the customer. In this example implementation, a token-based authentication mechanism is provided to enhance security for using the API for stateless cloud authentication (e.g., in which the token should not include the user password and is encrypted/decrypted by the individual asymmetric keys).

Below is the general workflow for a typical use case in which a cluster of devices (e.g., firewalls and/or other types of devices) are managed by Panorama 110 (e.g., or another device management platform can be similarly used in this example environment). Specifically, at a first stage of the workflow, Panorama pushes an API key certificate to each of the devices (e.g., firewalls) 122A-C. At a second stage, user 108 sends a Keygen command to devices 122A-C, which as shown in this example is received at device 122A (e.g., devices 122A-C can be located behind a load balancer), and the request includes their credentials (e.g., username and password). At a third stage, an API key is generated and sent back to the user. In this example implementation, the API key (e.g., token) can be generated by the firewall (e.g., when receiving a "keygen" command, and/or Panorama can perform the key generation per the request from device 122A (e.g., the firewall)). At a fourth stage, user 108 sends an API request (e.g., such as a get command, a set command, etc.) with the API key (e.g., token), which is received at a different device, shown as device 122C (e.g., a different firewall). Device 122C validates the API request based on the API key, such as similarly described above with respect to FIGS. 1A, 2, and 3 (e.g., including validation of the opaque data, such as similarly described above). If the API key is validated, then device 122C will execute the command associated with the API request and return the result to user 108.

The API supports an example basic authentication (e.g., username and password). However, this information is generally needed during key generation. When the user 108 sends a REST or XML API, there is not a need to send the username and password information again, rather just the API key (e.g., token, which can be encrypted and decrypted using an asymmetric key pair) is sent. In this example implementation, the API key is validated prior to the firewall executing the associated API command. As such, the disclosed API key techniques facilitate enhanced security for using an API for providing stateless cloud authentication.

Use Cases for Stateless Cloud Authentication for Security Services

Authentication for Prisma Access

Prisma Access (PA) is a cloud-based security infrastructure service, which is commercially available from Palo Alto Networks, Inc., headquartered in Santa Clara, CA, that helps customers extend the best-in-breed security to their remote network locations and their mobile users without having to build out their own global security infrastructure. With the Prisma Access, Palo Alto Networks automatically deploys firewalls (e.g., NGFWs) and GlobalProtect portals and gateways in the locations where customers need them. The firewalls can range from single to hundreds of firewalls per customer. These firewalls generally can be spun up and down dynamically.

To perform user authentication, a firewall and IDP need to be configured and manual configuration on the IDP typically makes it difficult to keep the configuration on the IDP up to date. For example, the gateways will often have different Assertion Customer Service (ACS) URLs (e.g., which provide an endpoint on the service provider where the identity provider will redirect to with its authentication response) that need to be configured on IDPs, and the gateways can be scaled up and down based on the business requirements.

As is common today, with gateways in multiple regions, customers typically find it difficult to add their gateways as applications in their SAML IdP. Also, when customers need to spin up new gateways in new regions in a short period of time, customers typically find it challenging to keep their IdP configurations up to date. For example, they do not get to fully utilize their firewalls until they add all their new gateways to the IdP.

Prisma Access (PA) firewalls can be configured in the following two ways. First, Prisma Access firewalls can be configured using the Prisma Access Cloud Management Portal. Second, PA firewalls can be configured using the Panorama management platform.

SAML configuration for PA firewalls is used in the following two example scenarios: (1) mobile users, such as on managed devices to authenticate to the Mobile User GlobalProtect (GP) Portal and gateways, and/or on unmanaged devices to authenticate to the PA Clientless VPN Portal; and (2) users on a remote network to authenticate to Remote Network Gateways for Authentication Policy.

Customer examples will now be provided below. A first customer, ACME Inc., is a GPCS customer that wants to authenticate its users using SAML. They use Okta as their IdP. The steps they followed is a laborious effort to add every gateway information. A second customer, BigCo Corp., is a GlobalProtect (GP) customer that has a global deployment of Portals and Gateways. They use PingID as their IdP. Every time they spin up a new gateway, they register the new gateway as a SAML 2.0 web application in PingID.

Another use case is for an API token, which encrypts the timestamp, username, and admin role name by the private key of the API key certificate, in the new infrastructure of PAN management API (e.g., such as similarly described above with respect to FIG. 4).

As will now be apparent to one of ordinary skill in the art, the disclosed techniques for stateless authentication for security services can be used in these various scenarios to facilitate enhanced solutions for secure and easier to configure and maintain stateless authentication for security services.

Figure 5:
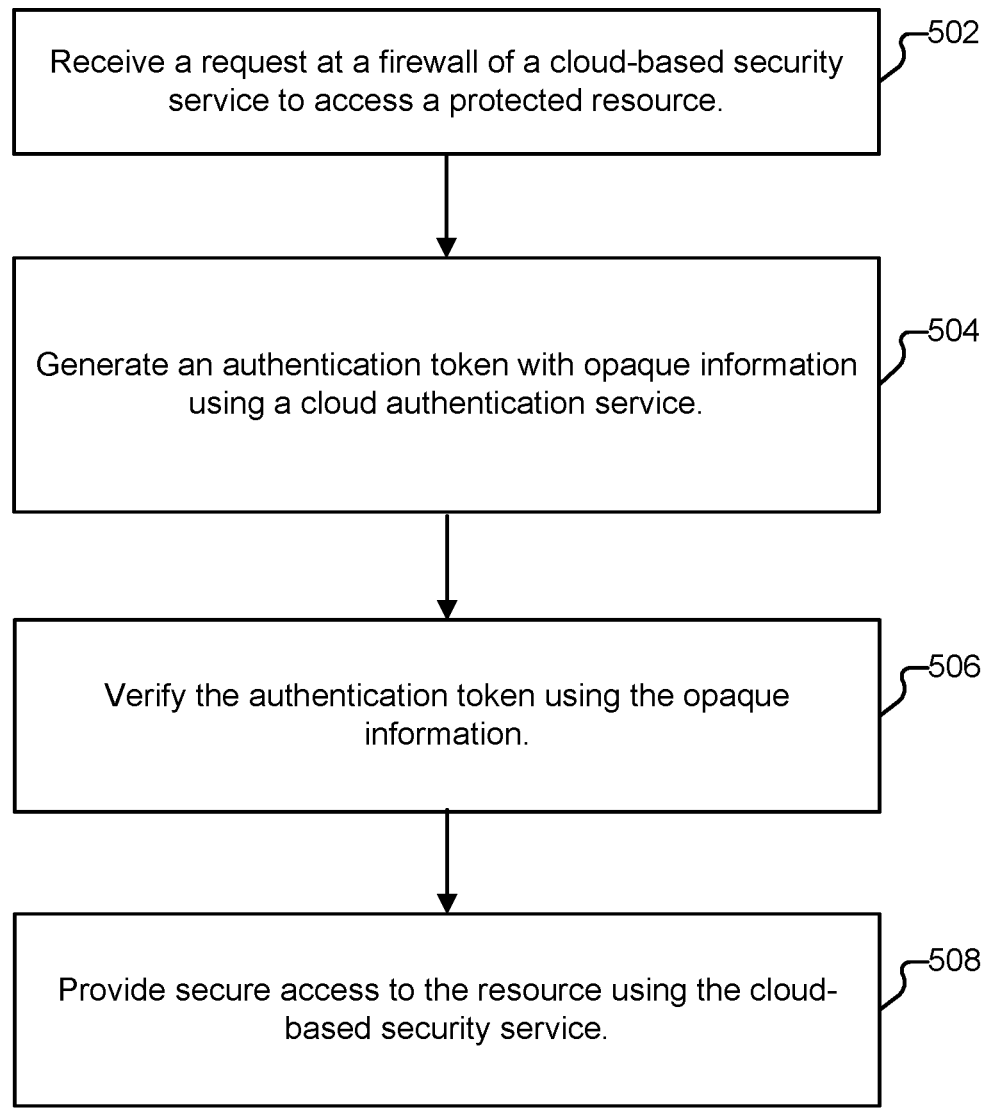
FIG. 5 illustrates a process for providing stateless cloud authentication in accordance with some embodiments.

Example Processes for Providing Stateless Cloud Authentication for Security Services FIG. 5 illustrates a process for providing stateless cloud authentication in accordance with some embodiments. In one embodiment, process 500 is performed using the system architectures described above (e.g., such as described above with respect to FIGS. 1A-4).

The process begins at 502 when a request at a first firewall of a cloud-based security service to access a protected resource is received.

At 504, an authentication token with opaque information is generated using a cloud authentication service. For example, the token (e.g., CAS auth token) can be generated with opaque information as similarly described above with respect to FIGS. 1A, 2, and 3.

At 506, the authentication token is verified using the opaque information. For example, the token (e.g., CAS auth token) can be verified using the opaque information as similarly described above with respect to FIGS. 1A, 2, and 3.

At 508, secure access to the resource is provided using the cloud-based security service.

Figure 6:
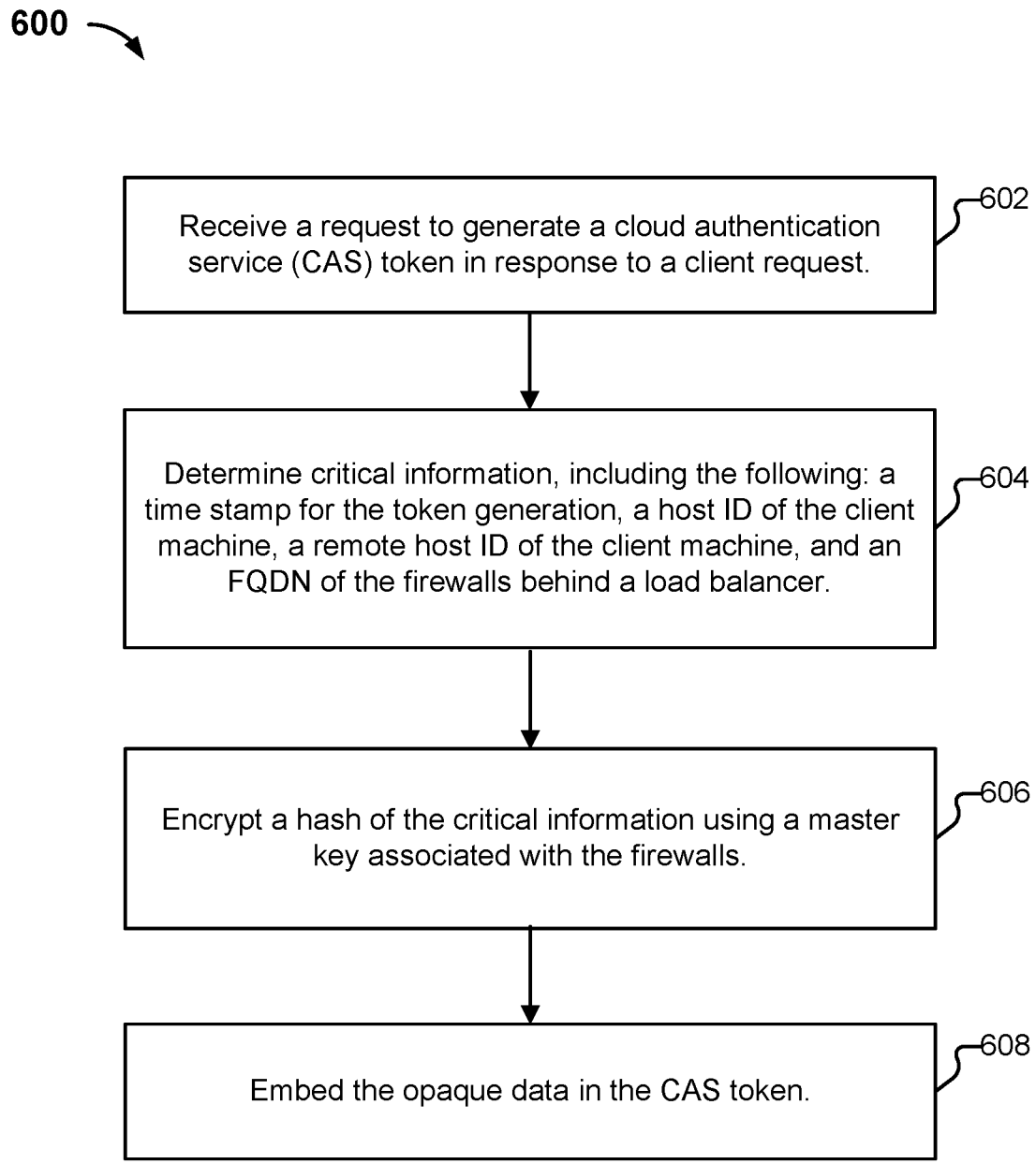
FIG. 6 illustrates another process for providing stateless cloud authentication in accordance with some embodiments.

FIG. 6 is another flow diagram illustrating a process for providing stateless cloud authentication in accordance with some embodiments. In one embodiment, process 600 is performed using the system architectures described above (e.g., such as described above with respect to FIGS. 1A-4).

The process begins at 602 when a request to generate a cloud authentication service (CAS) token is received in response to a client request.

At 604, critical information is determined for generating the CAS token. For example, the critical information can include the following: a time stamp for the token generation, a host name of the client machine, a remote host ID of the client machine, and an FQDN of the firewalls behind a load balancer, such as similarly described above with respect to FIGS. 1A, 2, and 3.

At 606, a hash of the critical information is encrypted using a master key associated with the firewalls. For example, the hash and encryption of the critical information can be implemented as similarly described above with respect to FIGS. 1A, 2, and 3.

At 608, the opaque data is embedded in the CAS token. For example, the embedding of the opaque data in the CAS token can be implemented as similarly described above with respect to FIGS. 1A, 2, and 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
receive a request at a first firewall of a cloud-based security service to access a protected resource;
generate an authentication token with opaque information using a cloud authentication service, wherein the opaque information is embedded in the authentication token, wherein the authentication token is encrypted, and wherein the opaque information includes one or more of the following: a host ID of a client machine, a remote host ID or IP address of a client machine, and/or a fully qualified domain name (FQDN) of a firewall behind a load balancer; and
verify the authentication token using the opaque information, comprising to:
decrypt the authentication token to obtain a decrypted authentication token and embedded opaque information:
compare the embedded opaque information with the opaque information; and
in the event that the embedded opaque information does not match the opaque information, determine that the decrypted authentication token is not verified; and
a memory coupled to the processor and configured to provide the processor with instructions.

2. The system recited in claim 1, wherein the first firewall and a second firewall of the cloud-based security service share a master key.

3. The system recited in claim 1, wherein the opaque information includes a time stamp.

4. The system recited in claim 1, wherein the opaque information is hashed.

5. The system recited in claim 1, wherein the opaque information is encrypted.

6. The system recited in claim 1, wherein the processor is further configured to:
provide secure access to the resource using the cloud-based security service.

7. The system recited in claim 1, wherein the processor is further configured to:
provide secure access to the resource via a second firewall of the cloud-based security service, wherein the first firewall and a second firewall of the cloud-based security service share a master key.

8. The system recited in claim 1, wherein the processor is further configured to:
block access to the resource using the cloud-based security service.

9. A method, comprising:
receiving a request at a first firewall of a cloud-based security service to access a protected resource;
generating an authentication token with opaque information using a cloud authentication service, wherein the opaque information is embedded in the authentication token, wherein the authentication token is encrypted, and wherein the opaque information includes one or more of the following: a host ID of a client machine, a remote host ID or IP address of a client machine, and/or a fully qualified domain name (FQDN) of a firewall behind a load balancer; and
verifying the authentication token using the opaque information, comprising:
decrypting the authentication token to obtain a decrypted authentication token and embedded opaque information;
comparing the embedded opaque information with the opaque information; and
in the event that the embedded opaque information does not match the opaque information, determining that the decrypted authentication token is not verified.

10. The method of claim 9, wherein the first firewall and a second firewall of the cloud-based security service share a master key.

11. The method of claim 9 wherein the opaque information includes a time stamp.

12. A computer program product, the computer program product being embodied in a tangible non-transitory computer readable storage medium and comprising computer instructions for:

receiving a request at a first firewall of a cloud-based security service to access a protected resource;

generating an authentication token with opaque information using a cloud authentication service, wherein the opaque information is embedded in the authentication token, wherein the authentication token is encrypted, and wherein the opaque information includes one or more of the following: a host ID of a client machine, a remote host ID or IP address of a client machine, and/or a fully qualified domain name (FQDN) of a firewall behind a load balancer; and verifying the authentication token using the opaque information, comprising:

decrypting the authentication token to obtain a decrypted authentication token and embedded opaque information:

comparing the embedded opaque information with the opaque information; and in the event that the embedded opaque information does not match the opaque information, determining that the decrypted authentication token is not verified.

13. The computer program product recited in claim 12, wherein the first firewall and a second firewall of the cloud-based security service share a master key.

14. The computer program product recited in claim 12, wherein the opaque information includes a time stamp.

* * * * *